US010363485B2

(12) United States Patent
Magdalena et al.

(10) Patent No.: US 10,363,485 B2
(45) Date of Patent: *Jul. 30, 2019

(54) OPACITY METHOD AND DEVICE THEREFOR

(71) Applicant: KING.COM LIMITED, St. Julians (MT)

(72) Inventors: Ignacio Pintos Magdalena, Barcelona (ES); Patrik Swartz, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,025

(22) Filed: Jan. 2, 2018

(65) Prior Publication Data

US 2018/0117467 A1    May 3, 2018

Related U.S. Application Data

(63) Continuation of application No. 15/305,967, filed as application No. PCT/EP2015/058794 on Apr. 23, (Continued)

(51) Int. Cl.
*A63F 13/52* (2014.01)
*G09G 5/02* (2006.01)
(Continued)

(52) U.S. Cl.
CPC ............. *A63F 13/52* (2014.09); *A63F 13/35* (2014.09); *A63F 13/537* (2014.09); *A63F 13/77* (2014.09);
(Continued)

(58) Field of Classification Search
CPC ........ A63F 13/52; A63F 13/35; A63F 13/537; A63F 13/77; A63F 13/837; G06F 3/0481;
(Continued)

(56) References Cited

U.S. PATENT DOCUMENTS

| 5,388,990 A * | 2/1995 | Beckman | G09B 9/08 345/419 |
|---|---|---|---|
| 9,855,501 B2 * | 1/2018 | Magdalena | A63F 13/52 |
| 2002/0002077 A1 * | 1/2002 | Shimizu | A63F 13/10 463/30 |
| 2006/0046844 A1 * | 3/2006 | Kaneko | A63F 13/10 463/32 |

(Continued)

FOREIGN PATENT DOCUMENTS

| EP | 1 825 894 A1 | 8/2006 |
|---|---|---|
| EP | 2441504 A2 | 4/2012 |

OTHER PUBLICATIONS

International Search Report, dated Jul. 2, 2015, and Written Opinion issued in priority International Application No. PCT/EP2015/058794.

*Primary Examiner* — Corbett B Coburn
(74) *Attorney, Agent, or Firm* — Saul Ewing Arnstein & Lehr LLP

(57) ABSTRACT

A method of modifying a transparency factor of one or more objects in a computer game. A display of a computer device displays a first object having a transparency factor at a first location, said first object overlying at least one of a plurality of game objects. In response to a trigger event at least one of said transparency factor of the first object, a transparency factor of a game pointer, and a transparency factor of at least one game object are modified and at least one of said first object, said game pointer, and said at least one game object are displayed with said at least one modified transparency factor.

18 Claims, 16 Drawing Sheets

Related U.S. Application Data 2015, now Pat. No. 9,855,501, which is a continuation-in-part of application No. 14/259,803, filed on Apr. 23, 2014, now Pat. No. 9,766,768.

(51) Int. Cl.

| | | |
|---|---|---|
| *A63F 13/35* | (2014.01) | |
| *A63F 13/77* | (2014.01) | |
| *G06F 3/0481* | (2013.01) | |
| *A63F 13/837* | (2014.01) | |
| *A63F 13/537* | (2014.01) | |

(52) U.S. Cl.
CPC .......... *A63F 13/837* (2014.09); *G06F 3/0481* (2013.01); *G09G 5/026* (2013.01); *G06F 3/04812* (2013.01); *G09G 2340/12* (2013.01)

(58) Field of Classification Search
CPC . G06F 3/04812; G09G 5/026; G09G 2340/12
See application file for complete search history.

(56) References Cited

U.S. PATENT DOCUMENTS

| | | | |
|---|---|---|---|
| 2006/0199626 A1 | 9/2006 | Ortiz et al. | |
| 2007/0168309 A1* | 7/2007 | Tzruya | A63F 13/10 706/45 |
| 2011/0125594 A1* | 5/2011 | Brown | G06Q 30/02 705/14.73 |
| 2013/0109468 A1* | 5/2013 | Okamura | A63F 13/577 463/30 |
| 2014/0133755 A1* | 5/2014 | McCloskey | G06T 11/60 382/173 |
| 2015/0309666 A1* | 10/2015 | Swartz | A63F 13/23 463/33 |
| 2015/0310660 A1* | 10/2015 | Mogilefsky | G06T 13/40 345/422 |
| 2016/0023110 A1* | 1/2016 | Tawarayama | A63F 13/56 463/6 |
| 2016/0275717 A1* | 9/2016 | Mizoguchi | G06T 19/00 |
| 2017/0043251 A1* | 2/2017 | Magdalena | A63F 13/52 |

\* cited by examiner

OPACITY METHOD AND DEVICE THEREFOR

CROSS REFERENCE TO RELATED APPLICATIONS

This is a continuation of U.S. application Ser. No. 15/305,967, filed on Oct. 21, 2016, which claims the priority of PCT/EP2015/058794, filed on Apr. 23, 2015, which is a continuation-in-part of U.S. application Ser. No. 14/259,803, filed Apr. 23, 2014, the entire contents of each of which are fully incorporated herein by reference.

FIELD OF THE INVENTION

Some embodiments relate to controlling a display responsive to user engagement via a user interface with displayed elements on the interface of a computer device.

BACKGROUND OF THE INVENTION

There are many technical challenges and technical considerations facing the designer of computer games executed on user or computer devices having a user interface, such as designing a controllable user interface in the context of available computer devices and resources, which may be limited.

Another technical challenge can involve enabling a game to be fun, accessible and compelling even when there is limited display resources available, such as when a game is being played on a smartphone, tablet or other small or portable computer.

Another challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback based on the game mechanics and successful utilisation by the user to reinforce the user or player sense of success and accomplishment.

Providing effective feedback in real time during game play, without hindering or disengaging the player is not trivial, especially when limited display resource may be available on the user device.

There are therefore many technical challenges when designing computer implemented games, particularly in providing a challenge to a user or player that is engaging with feedback that ultimately rewards the user so as to provoke repeat play without disengaging or frustrating the user. This may, but not exclusively apply to "casual games".

SUMMARY OF THE INVENTION

According to a first aspect, there is provided a method comprising the following implemented by at least one processor of a device, said at least one processor being in communication with a user interface and at least one memory: displaying on a display of said device a display area having a plurality of game objects displayed at game object positions; displaying a first object having a transparency factor at a first location, said first object overlying at least one of said plurality of game objects; detecting a trigger event; modifying at least one of said transparency factor of said first object, a transparency factor of a game pointer, and a transparency factor of at least one game object; and displaying at least one of said first object, said game pointer, and said at least one game object with said at least one modified transparency factor.

In one embodiment, the transparency factor may comprise alpha blending.

In one embodiment, the step of modifying at least one of said transparency factor of said first object, a transparency factor of a game pointer, and a transparency factor of at least one game object, occurs in dependence upon the distance between said first location and a trigger event location associated with the trigger event.

In one embodiment, the method may further comprise increasing at least one of said transparency factor of said first object, said transparency factor of a game pointer, and said transparency factor of at least one game object if the distance between the trigger event location and said first location decreases.

In one embodiment, the method may further comprise decreasing at least one of said transparency factor of said first object, said transparency factor of a game pointer, and said transparency factor of at least one game object if the distance between the trigger event location and said first location increases.

In one embodiment, the first location is within a first area of the game area, the method further comprising the steps of: increasing at least one of said transparency factor of said first object, a transparency factor of a game pointer, and a transparency factor of at least one game object if said trigger event location enters said first area of the game area In one embodiment, the first location is within a first area of the game area, the method further comprising the steps of: decreasing at least one of said transparency factor of said first object, a transparency factor of a game pointer, and a transparency factor of at least one game object if said trigger event location exits said first area of the game area.

In one embodiment, the trigger event comprises determining the position of said game pointer.

In one embodiment, the trigger event comprises determining the position of a game object displayed on the game area.

In one embodiment, the trigger event comprises determining the position of said at least one game object displayed on the game area.

In one embodiment, the trigger event trigger event comprises user input.

In one embodiment, the trigger event comprises determining the trajectory or predicted trajectory of a game object.

In one embodiment, the method may further comprise: determining whether to modify at least one of said transparency factor of said first object, said transparency factor of a game pointer, and said transparency factor of at least one game object in dependence upon data stored in said at least one memory in association with said first object.

In one embodiment, the modification of at least one of said transparency factor of said first object, said transparency factor of a game pointer, and said transparency factor of at least one game object provides a gradual displayed transparency transition of at least one of the first object, the game pointer and the at least one game object from an initial level to a set transparency level.

In one embodiment, the repeated modification may be reversed after a threshold associated with the trigger event is reached.

According to a second aspect, there is provided a computer program comprising computer executable instructions which when run are configured to provide the method of any of the embodiments of the first aspect.

According to a third aspect, there is provided a device having a display, a user interface, at least one memory, and at least one processor in communication with said user interface and said at least one memory, the at least one processor configured to: display a display area on said display comprising a plurality of game objects displayed at game object positions; display said first object having a transparency factor at a first location, said first object overlying at least one of said plurality of game objects; detect a trigger event; modify at least one of said transparency factor of said first object, a transparency factor of a game pointer, and a transparency factor of at least one game object; and display at least one of said first object, said game pointer, and said at least one game object with said at least one modified transparency factor.

In one embodiment, the stored transparency factor comprises alpha blending.

In one embodiment, the device is connected by a network interface to a server providing said first object and associated transparency factor to said device.

In one embodiment, the at least one of said transparency factor of said first object, said transparency factor of a game pointer, and said transparency factor of at least one game object, comprises an initial state and an end state.

In one embodiment, the initial state comprises zero transparency and the end state comprises transparency in the range 50% to 100%.

According to a fourth aspect there is provided a server connected by a network interface to the device of any of the embodiments of the third aspect, said server having at least one memory or database storing at least one first object and associated one or more display characteristics including a transparency factor and configured to provide said at least one first object and associated display characteristics to said device.

According to a fifth aspect, there is provided a method of controlling a user interface responsive to user input with a display area comprising a plurality of game object positions on said interface, the method comprising the following implemented by at least one processor of a device in communication with said interface and at least one memory: displaying an area having a plurality of game objects displayed at said game object positions, displaying at least one first object having one or more display characteristics in a first area of said displayed area overlaying at least partially at least one displayed game object on said area, detecting a trigger event associated with said first area, modifying said one or more display characteristics of said first object in dependence on detection of said trigger event, and displaying said first object in said first area with said modified characteristic.

In one embodiment, the one or more first object display characteristics may further comprise object type.

In one embodiment, the object type characteristic may comprise a current or high score.

In one embodiment, the object type characteristic may comprise an offer or advertisement.

In one embodiment, the trigger event associated with said first area may comprise detecting user input associated with said at least one game object coinciding with or overlaid by said first area.

In one embodiment, the trigger event associated with said first area may comprise detecting a user object or a user object trajectory that causes said processor to display said user object within the first area in dependence on user input.

According to a sixth aspect, there is provided a device having a user interface responsive to user input with a display area comprising a plurality of game object positions, at least one memory storing a plurality of game objects and associated characteristics and at least one first object with one or more display characteristics, and at least one processor in communication with said interface and said at least one memory, the at least one processor configured to: display the area having a plurality of game objects displayed at said game object positions on said interface, display the at least one first object having one or more display characteristics in a first area of said area overlaying at least partially at least one displayed game object, detect a trigger event associated with said first area, modify said one or more display characteristics stored in said at least one memory of said first object in dependence on detection of said trigger event, and display said first object in said first area with said modified characteristic.

In one embodiment, the at least one first object characteristics stored in said at least one memory may comprise a transparency factor.

In one embodiment, the stored transparency factor may comprise alpha blending.

In one embodiment, the device may be connected by a network interface to a server providing said first object and associated one or more display characteristics to said device.

In one embodiment, the provided first object one or more display characteristics may comprise a transparency factor.

In one embodiment, the transparency factor may comprise an initial state and an end state.

In one embodiment, the initial state may comprise zero transparency and the end state may comprise transparency in the range 50% to 100%.

In one embodiment, the trigger event associated with said first area may comprise said processor receiving via said interface user input associated with at least one game object coinciding with or overlaid by said first area.

In one embodiment, the trigger event associated with said first area may comprise said processor receiving via said interface user input associated with a user object or user object trajectory that causes said processor to display said user object coinciding with at least one game object within said first area.

According to a seventh aspect, there is provided a computer readable storage device storing program code instructions which, when executed by a processor causes said processor to: display a game area comprising said first object at a first location; detect a trigger event associated with a trigger event location of the game area; modify said one or more display characteristics of said first object or said one or more display characteristics of a trigger event object at said trigger event location in dependence upon the distance between said trigger event location and said first location; and display said first object or said trigger event object with said modified characteristic.

According to an eighth aspect, there is provided a device having user interface means responsive to user input; and a memory means storing game objects and associated characteristics and at least one first object with one or more display characteristics, the device having at least one processing means in communication with said user interface means via communication means, the at least one processing means being configured to: display a game area comprising said first object at a first location; detect a trigger event associated with a trigger event location of the game area;

modify said one or more display characteristics of said first object or said one or more display characteristics of a trigger event object at said trigger event location in dependence upon the distance between said trigger event location and said first location; and display said first object or said trigger event object with said modified characteristic.

The display means may comprise user interface means.

The user interface means may comprise input means for receiving user input.

The input means may comprise touch control means.

The touch control means may comprise capacitive, resistive or gesture detecting means.

The memory means for storing said game objects, first game object and associated one or more display characteristics may be local or remote memory means connectable to the device via internal bus means or accessible via network interface means.

The network means may comprise a wide area network, such as the internet for example.

The memory means may be located with, or accessible by the device through a server having connection means connecting said server and device via the network means.

The one or more display characteristics may comprise transparency factor means, having an optional range of values including an initial state and an end state for rendering by graphic controller means onto said display means.

Other aspects and features are described with reference to the appended claims.

BRIEF DESCRIPTION OF DRAWINGS

To understand some embodiments, reference will now be made by way of example only to the accompanying drawings, in which.

DETAILED DESCRIPTION OF SOME EMBODIMENTS

Figure 1:
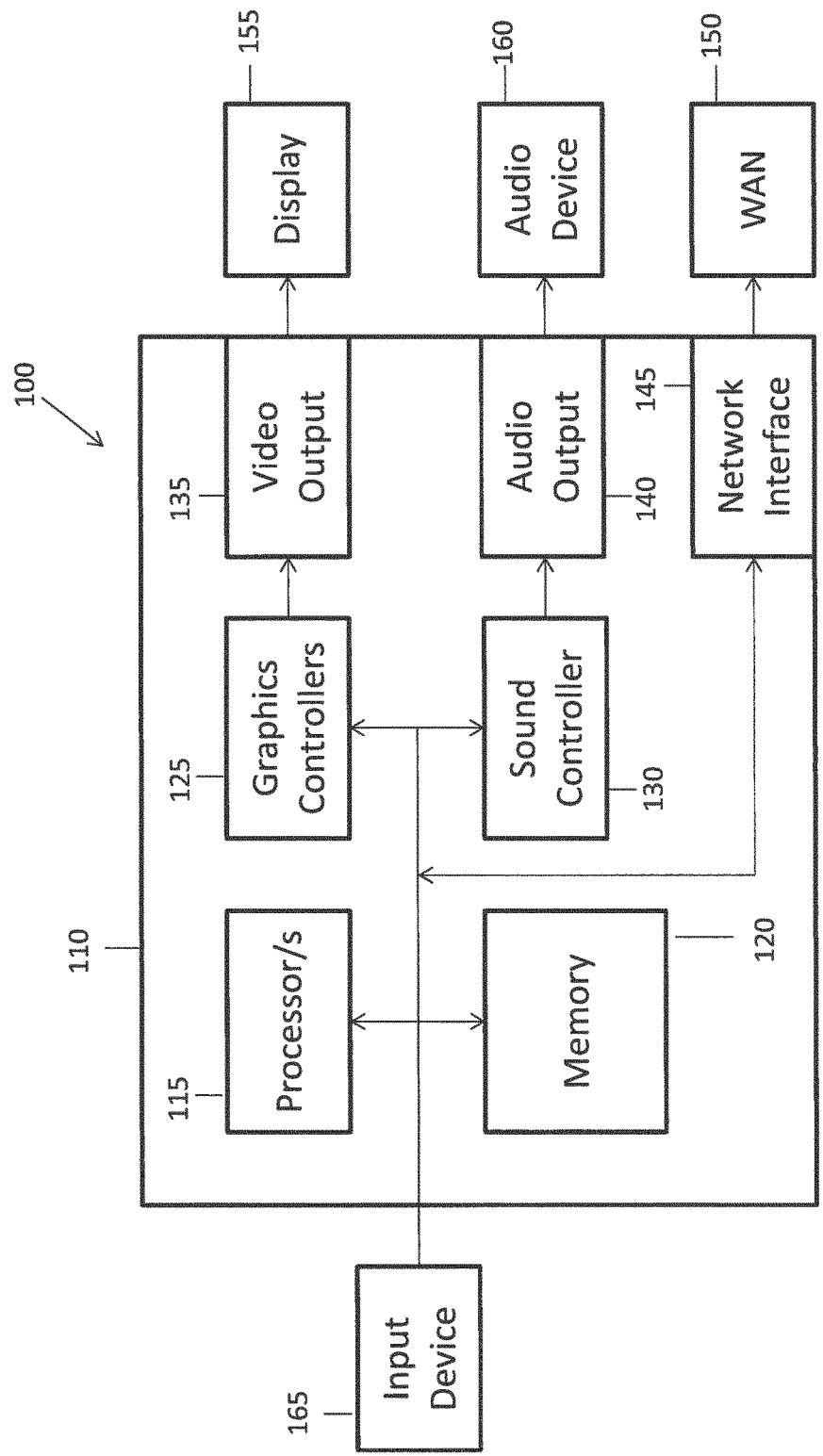
FIG. 1 shows an example client or user device of an embodiment.

A schematic view of a client or user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
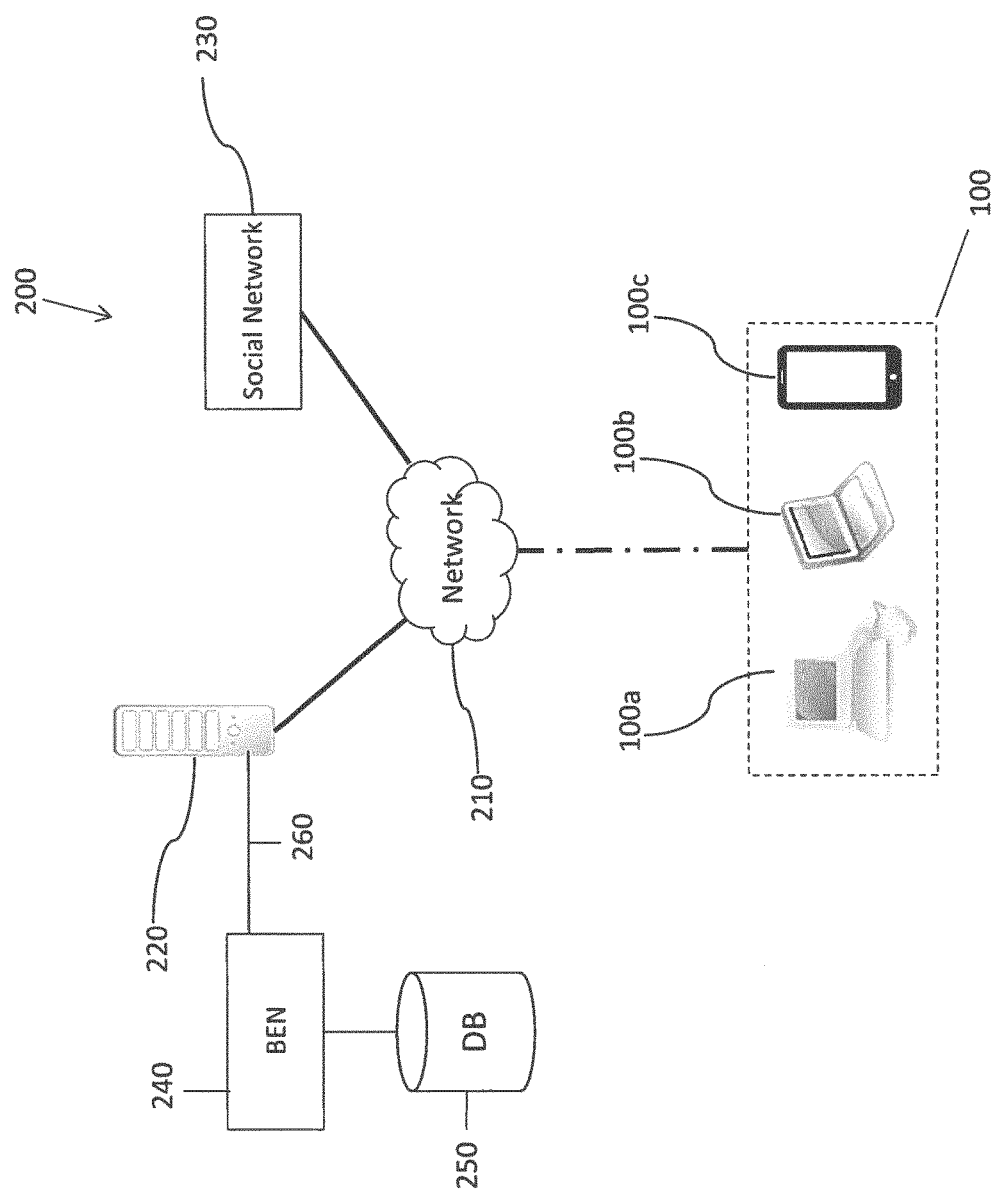
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more client or user devices 100, shown in the figure by way of example as user devices 100a, 100b and 100c, and may further provide connections to a social network 230 such as Facebook™.

Figure 3:
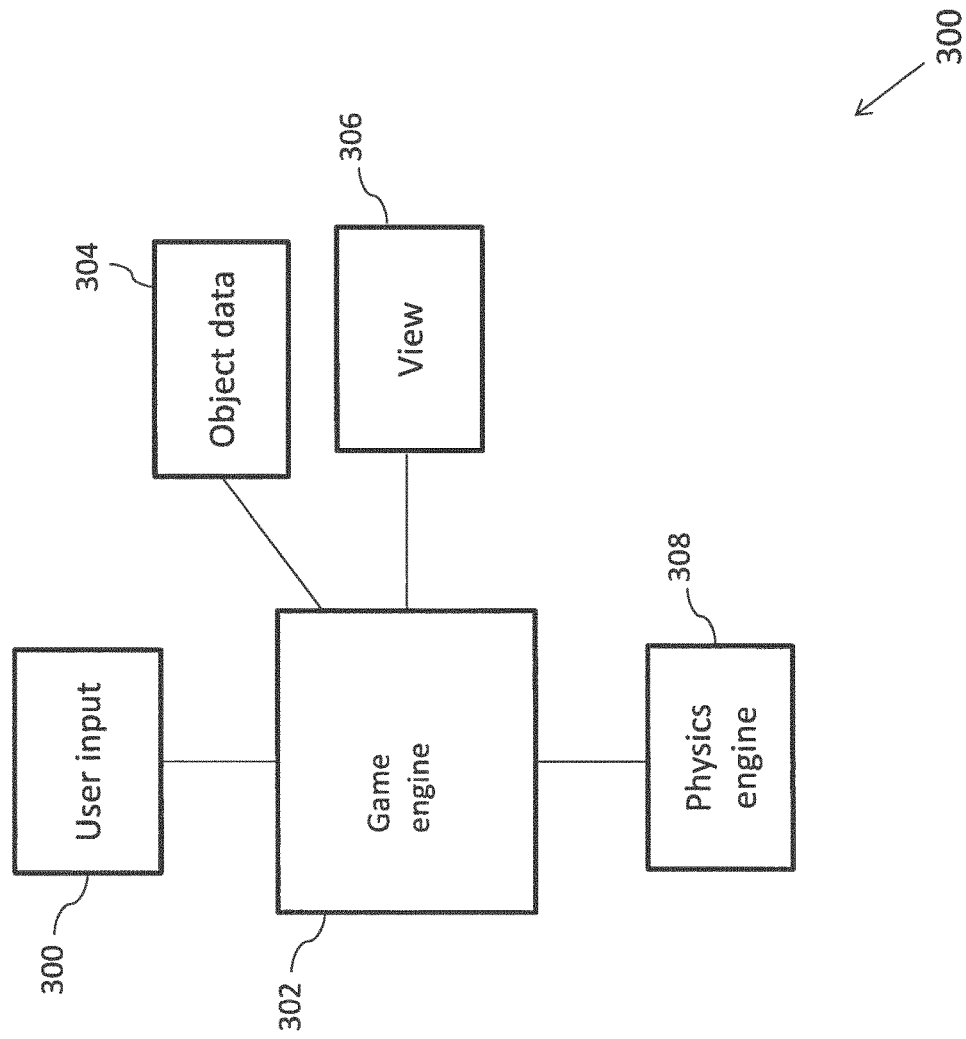
FIG. 3 illustrates a schematically shows the functional blocks of an embodiment, which may enable such game play.

Reference is made to FIG. 3 which schematically shows the functional blocks of an embodiment. The functional blocks may be implemented in the blocks described above with regard to FIG. 1, and may enable the user device 100 to engage in game play. A user input block 300 is shown.

This captures the user input and feeds the input to a game engine 302. In the games of some embodiments, this user input may control the releasing of a game object and the trajectory in which said object is released. This user input can be via any suitable user interface, as discussed earlier.

The game engine 302 will process the information provided by the user input.

For example, in a game wherein the objective is to launch a projectile onto the gameboard so as to remove game objects when in contact with them, the game engine 302 may process the information regarding the position of the projectile and determine whether or not the projectile is in contact with a game object and, therefore, whether the game object should be removed. In another example, in a game wherein the objective is to match elements of the same type by shifting their positions, the game engine 302 may process the information provided by user input to move a game object and determine whether or not a match has been made.

Each object has object data 304 associated therewith. The object data 304 may be stored in any suitable memory location. In some embodiments, the object data 304 may be considered to be part of the game engine 302 and in other embodiments may be considered to be outside the game engine 302. The object data 304 may provide information as to the properties of an object. These properties can include attribute information such as colour and/or whether or not an object has a particular function such as a so-called booster function. The object data 304 may include the position data, that is, information representing the position of the object in the displayed image.

In some embodiments, the game engine 302 will check if a game object satisfies the rule or rules to be removed from the display. The rule or rules define whether or not a condition has been satisfied. The condition will be dependent on the game. In some embodiments, said condition will be satisfied if the game objects are arranged to provide a sequence of at least three adjacent objects sharing at least one same characteristic. In other embodiments, the condition will be met if the game object is in contact or close proximity with another game object.

Thus, in some embodiments, the game engine 302 will be in control of determining whether or not to remove objects. The game engine 302 will have access to data for each object including its position and the at least one characteristic associated with the object, and will be able to determine if a removal condition has been met. If a removal condition is met, the objects in the match may be removed from the game area.

A physics engine 308 is provided which is configured to control the movement of moving objects on the display, for example the game objects in the arrangement or the player object. A player object may be a game object which is displayed moving along a determined target path. The physics engine may manage the movement of an object based on, for example, gravity which controls the falling of the object, a wave mechanism, collision detection, when the falling object hits another object and optionally rotation calculations when the falling object rolls, for example, down the side of the other objects. The physics engine may manage the movement of an object in dependence on a determined target path.

The movement of the object is thus controlled by the physics engine 308, which will control the movement of objects in the game area.

The physics engine 308 may be part of the game engine 302 or separate therefrom. In some embodiments, the physics engine 308 function may be provided by a physics engine in conjunction with another function, separate to the physics engine. That separate function may be a separate physics engine, part of the game engine or provided by one or more processors.

A view function 306 uses the object data to provide the displayed image with which the user is able to view and/or interact.

Figure 6:
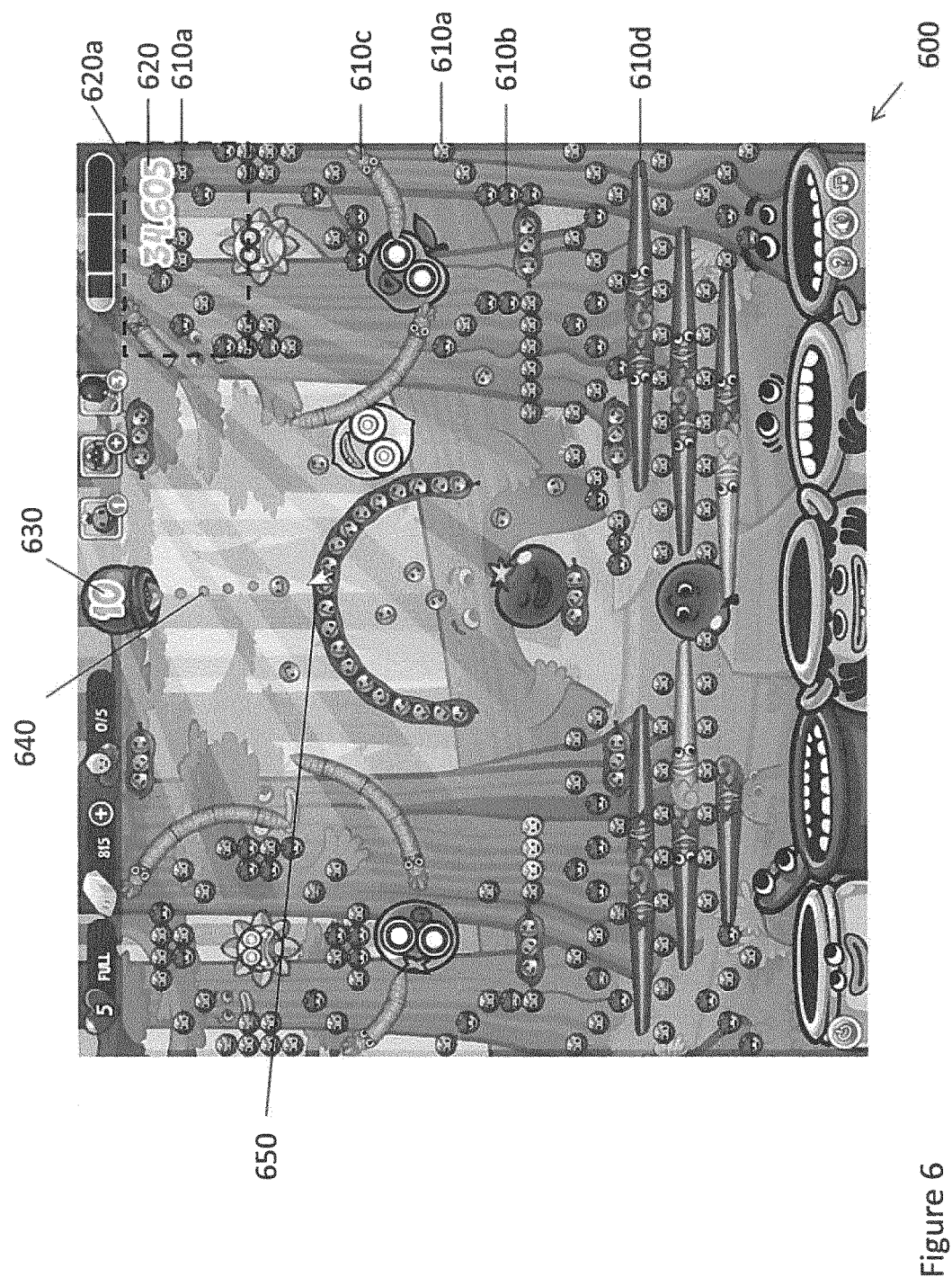
FIG. 6 shows an example display before modification according to an embodiment.
Figure 7:
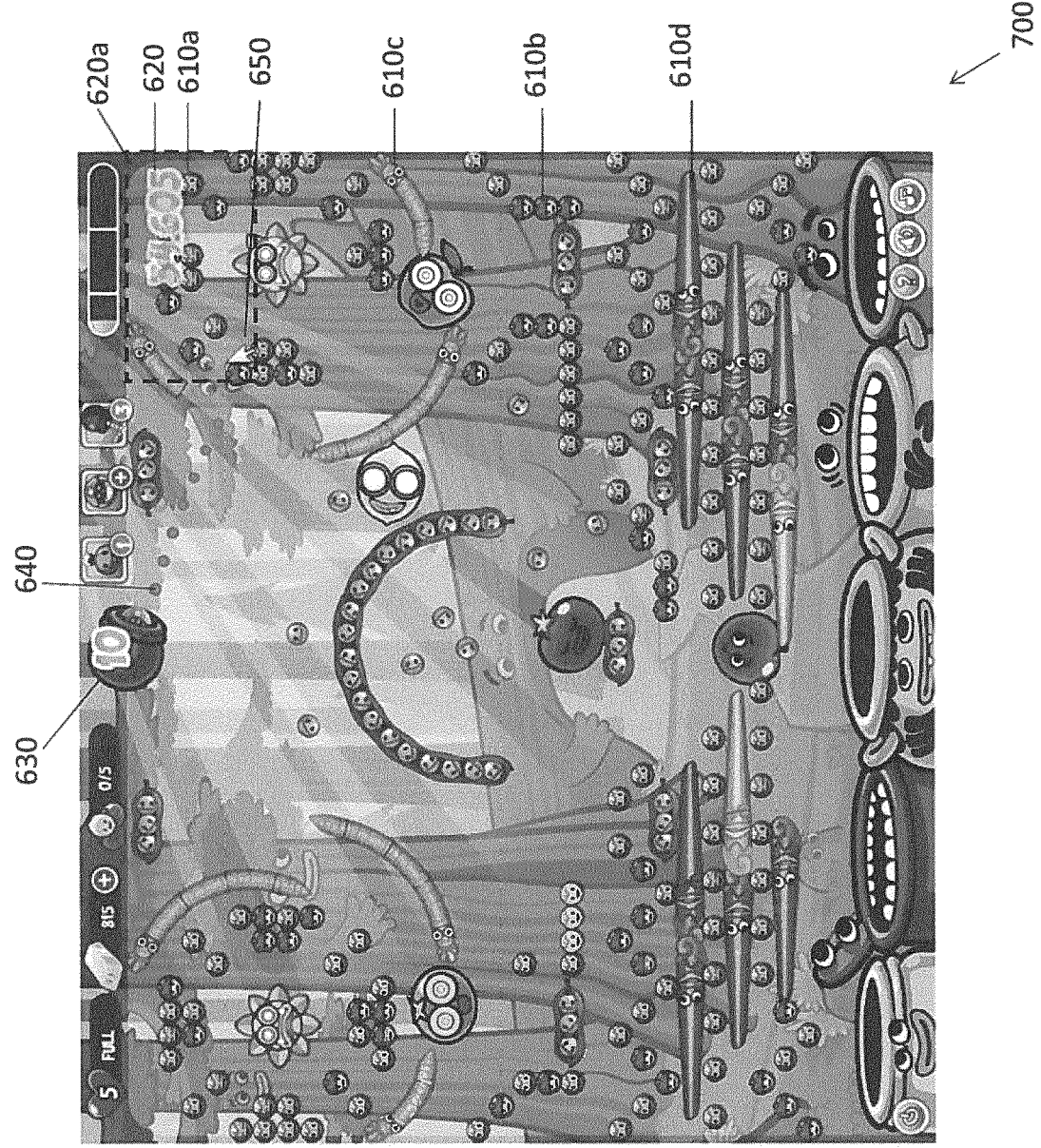
FIG. 7 shows an example display during modification according to an embodiment.
Figure 8:
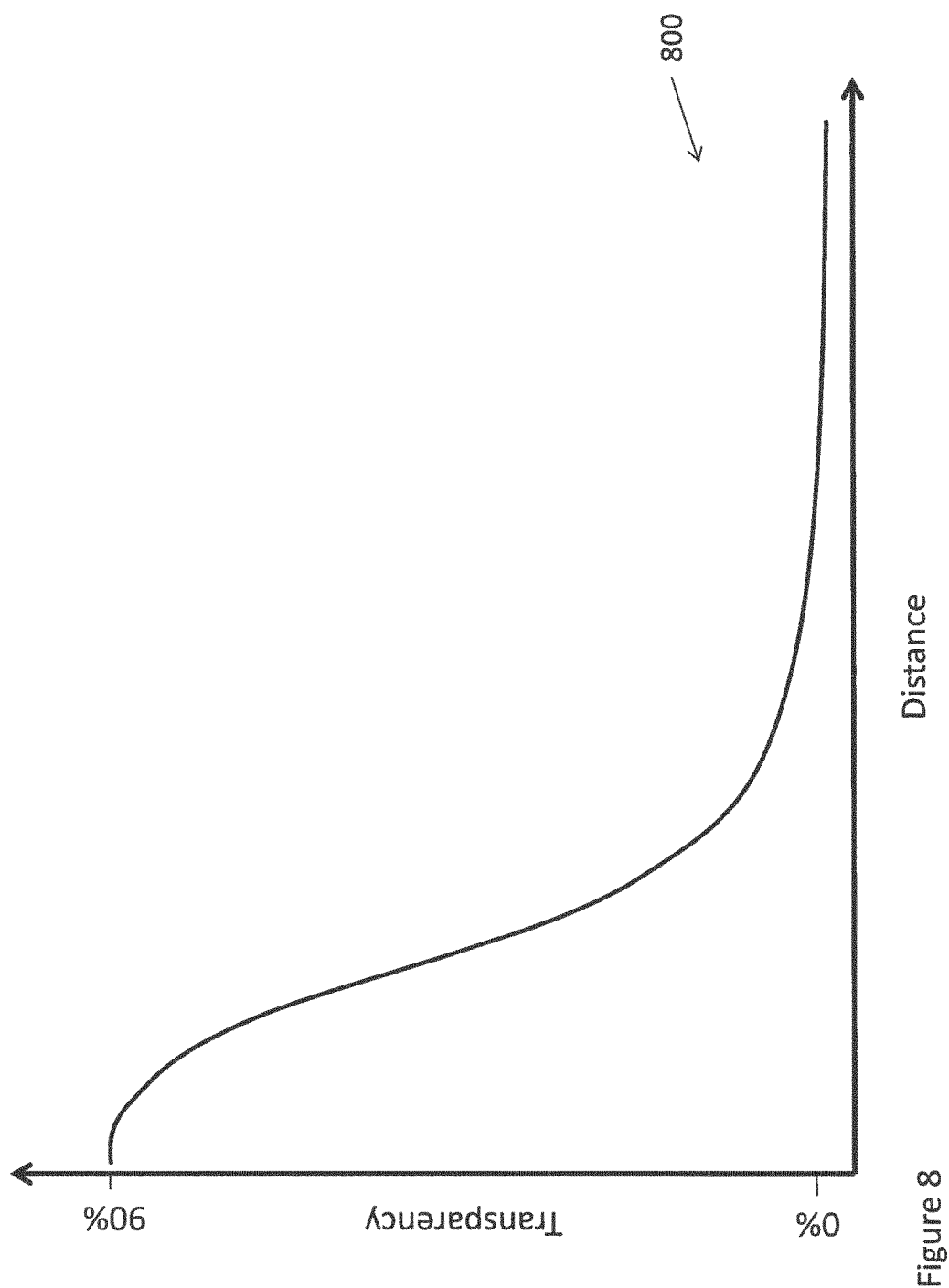
FIG. 8 depicts an example of how the transparency of the first object may vary with its distance from trigger event location according to an embodiment.

FIGS. 6, 7 and 8 illustrate screen shots of an example computer implemented game. FIG. 6 shows game objects 610a, 610b, 610c and 610d which must be, in this example eliminated by collision with a user object projectile 630 which is aimed by the user using for example touch input or mouse or other pointing device input on a user selected collision trajectory 640 with the game objects 610a, 610b, 610c, 610d. The screenshots are of "Papa Pear saga" by King.com, but those skilled in the art will recognise that other games and game mechanics, such as so-called "match-3" or "bubble shooters", "pinball" type games or indeed any other type of game may equally avail themselves to the embodiments herein described.

The inventors have recognised that there is a problem in displaying a plurality of game elements/objects on a game area simultaneously as the objects may overlap and obscure one another, thus causing frustration to the user and making the game harder to play. This problem may be particularly pronounced when displaying feedback information such as scores, offers or advertisements in an active area of a display which may therefore obscure elements or other information currently displayed to the user. This may be a problem with devices which have a relatively small screen such as tablets and smart phones. This may also be an issue with larger screens.

As can be seen clearly in FIG. 6, a first object 620 in the form of the current score 620 is overlaid on the game area. In some embodiments, the first object is displayed partially obscuring game objects 610a and 610b. A first area 620a encompassing the first object 620 may be defined. This first area may extend beyond the boundaries of the first object and may further encompass at least one displayed game object 610a as shown in the Figure.

The form of the first object 620 in this embodiment comprises a current score indicator. This is by way of description and to aid understanding and is not limiting.

For example, in other embodiments, the first object 620 may be a graphic depiction of other useful feedback or user or application oriented information, such as for example current progress towards a target, optional offers, extras such as "missions", "quests" or offers of game objects or elements such as so-called "boosters", depending on the game or application currently being executed by processor 115, 220. In other embodiments, the first object 620 may be a game object that can interact with other game objects on the game board.

In the embodiment represented by FIG. 6, the first object 620 comprises a graphical depiction or representation of the current score. This helpful information may be displayed on the gameboard itself rather than in a separate area of the screen so as to make optimum use of the screen resources which, on a mobile device may be particularly limited. However, displaying a first object 620 such as the score on the gameboard itself can be problematic as this first game object will obscure part of the gameboard. This problem may be particularly pronounced in cases in which the first object 620 obscures other game objects such as target game objects 610a and 610b on the board. Therefore, the user or player, in wishing to target game objects 610a and 610b in the vicinity of the first object 620 may feel frustration and disengagement since the first object 620, in this embodiment the current score 620, is obscuring the game objects 610a, 610b upon which it overlays and which the user may wish to target input. The first object 620 is provided with associated display characteristics stored in memory 120 of the device 100 or in the database 250 as previously described with reference to FIG. 2.

The associated display characteristics comprise at least a transparency factor in addition to size, colour and other attributes such as whether the first object is selectable and actions that may follow should it be so selected, and other characteristics that may be provided as relevant to the form and function of the first object.

When the first object obscures part of the gameboard, a trigger event may be detected and used to determine whether or not to alter the one or more display characteristics of the first object. The trigger event may be associated with a trigger event location and the modification of the one or more display characteristics may occur in dependence upon the distance between this trigger event location and the location of the first object. The following section of the description will describe some different embodiments of the trigger event.

In one embodiment, the trigger event comprises determining the location of an object displayed on the game area. The object may take the form of a game pointer 650. In response to user input this game pointer 650 can be dragged from one location on the game board to another. Alternatively, the object may take the form of a game object, for example the projectile 630. The at least one processor 115, 220 may be configured to, either periodically or in response to a change in the object, determine the location of the object. The trigger event location is taken to be the location of the object which is determined. In one embodiment, this trigger event location is then compared to the location of the first object 620 and the processor 115 determines whether or not to modify at least one of said transparency factor of said first object, a transparency factor of a game pointer, and a transparency factor of at least one game object in dependence upon the difference between the first object location and the trigger event location.

FIG. 6 illustrates an embodiment in which the user targets 640, or intends to target 640, a user projectile 630 towards the first object 620 and associated area 620a, since in this example the application "papa pear saga" involves the user launching projectiles 630 in a direction following a user input trajectory or guide 640 as shown in the Figure.

As shown in FIG. 7, the trigger event object, which in this embodiment takes the form of game pointer 650, now occupies a location which is closer to the first object 620 than was previously the case in FIG. 6. In this example, the distance between the determined trigger event location and the first object 620 is such that the processor 115 has proceeded to execute instructions which cause the modification of a display characteristic comprising the transparency characteristic of the first object 620 to increase transparency and re-displaying said first object 620.

In some embodiments, the change in the one or more display characteristics may occur abruptly when the distance between the trigger event location and the first object pass below a threshold value. In this case, the abrupt change may occur when the trigger event location passes into the area 620a encompassing the first game object 620.

In other embodiments, the change in the one or more display characteristics may occur gradually as the distance between the trigger event location and the first object changes. FIG. 8 provides an example of how in one embodiment the transparency may vary as a function of the distance between the trigger event location and the first object. It should be understood that the change that occurs to the transparency as the distance between the trigger event location and the first object varies need not proceed in only one direction. That is, when the distance increases between these two locations the transparency may then respond by steadily reducing to its default state.

Figure 9:
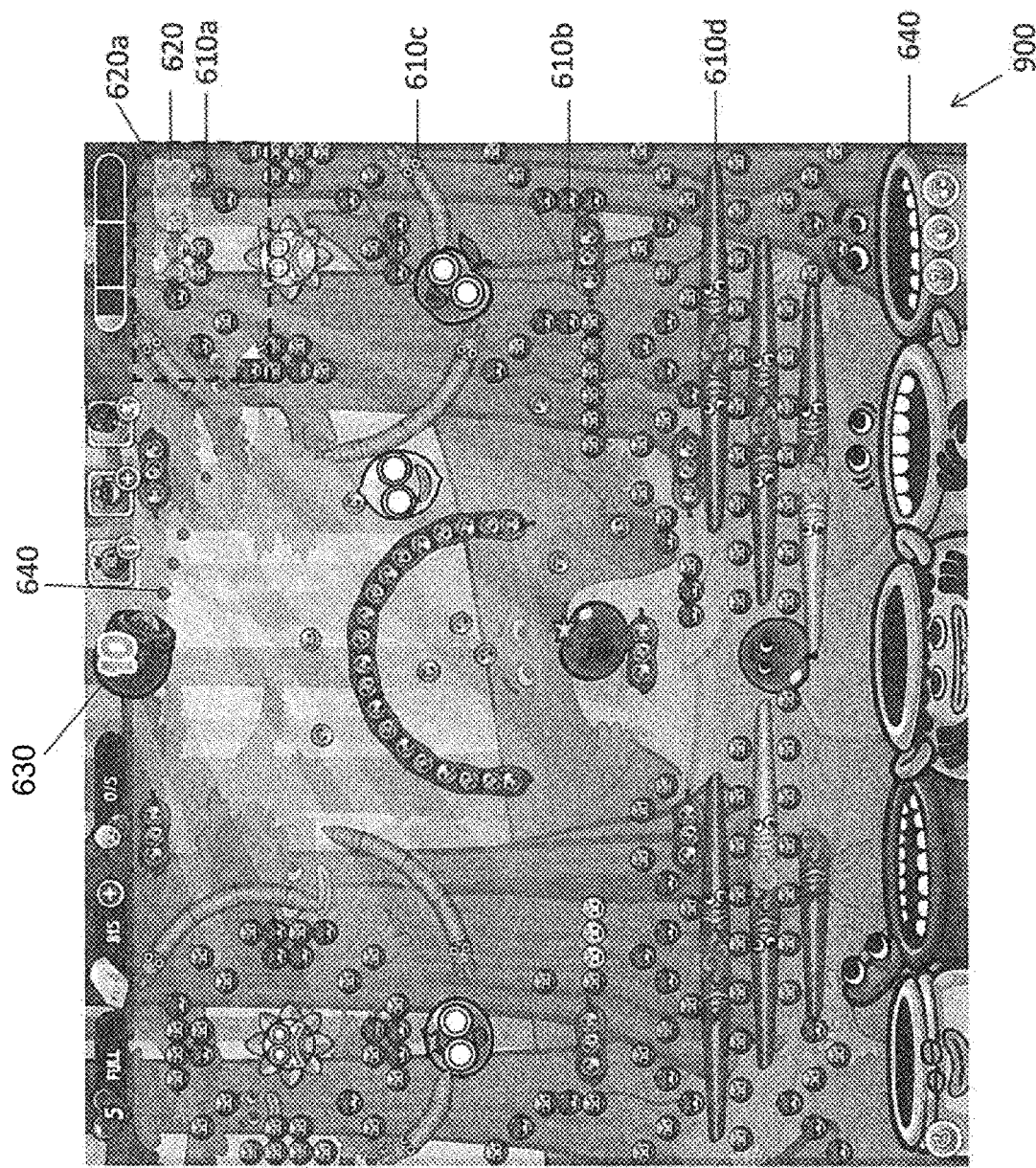
FIG. 9 depicts an example display after modification according to an embodiment.
Figure 10:
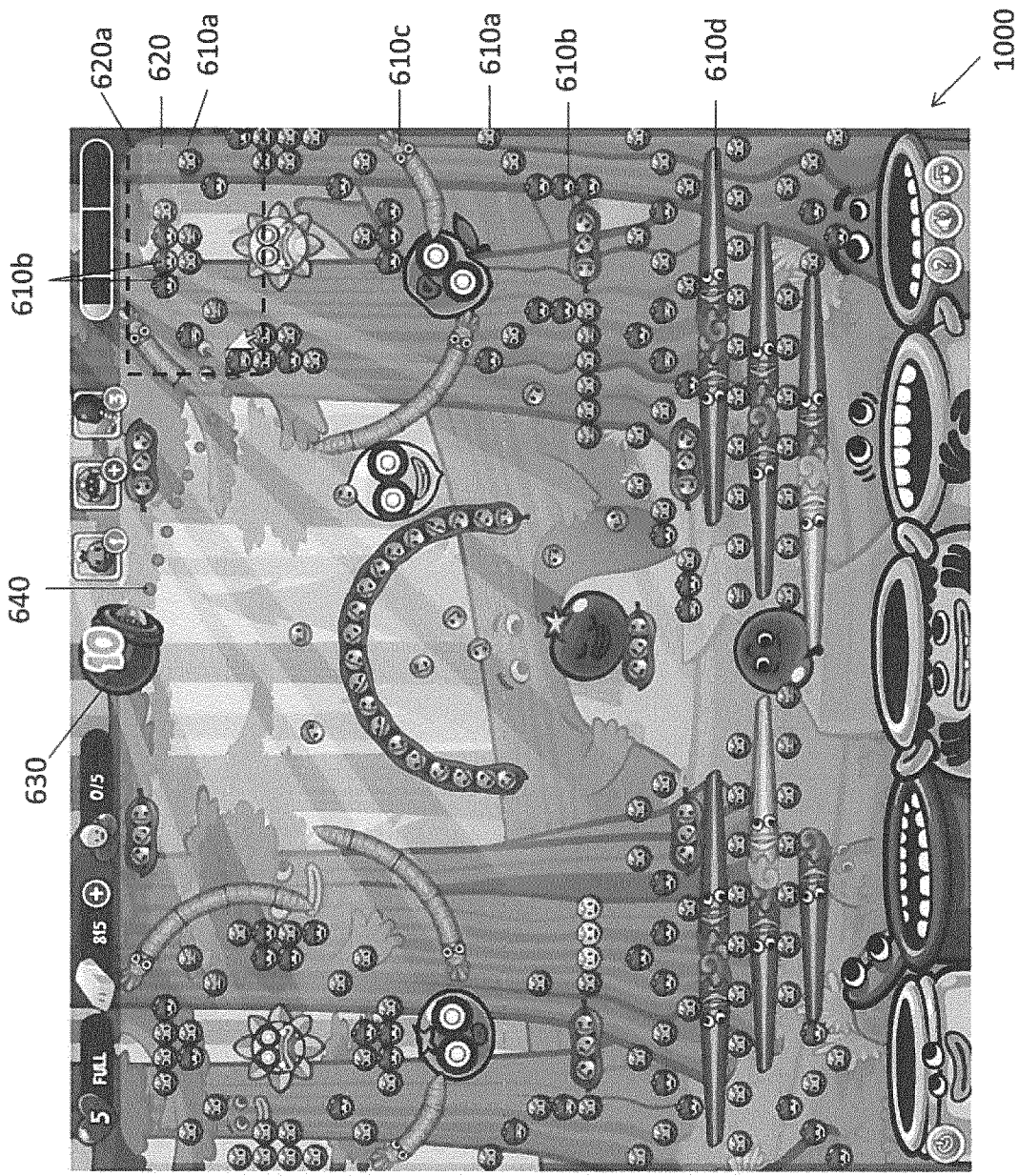
FIG. 10 depicts an example display showing an example end state of modification according to an embodiment.

In other embodiments, the change in the one or more display characteristics may occur over a period of time. In one embodiment, the transition of the first object to a more transparent state may be initiated when the distance between the trigger event location and the first object pass below a threshold value. In another embodiment, the transition may be initiated when the trigger event location passes into the area 620a encompassing the first object 620. When the transition is initiated the first object then steadily transitions over a set period of time from a non-transparent state to a transparent state. FIG. 7 shows the start of such a transition as the first object 620 has increased in transparency. FIGS. 9 and 10 show the continuation of the transition to a highly transparent state.

FIG. 9 illustrates a potential transparency modification towards an end state in which, as can be clearly seen with reference to FIG. 7, the game objects 610a, 610b previously obscured by the first object 620 and its associated area 620a are now visible via the modified transparency characteristic of displayed and modified first object 620.

FIG. 10 illustrates a potential transparency modification at a predefined end state in which, as seen with reference to FIG. 9, the first game object 620 is barely visible with all game objects 610a, 610b located within the first area 620a previously obscured, now rendered visible "through" the displayed first object 620 with a transparency characteristic modified to the end state. This end state may comprise an indicator of greater than 90% transparency for example.

Although the above description focuses on the use of determining the position of a game pointer as a trigger event, it would be understood that a number of other events could be used as a trigger event.

Figure 11:
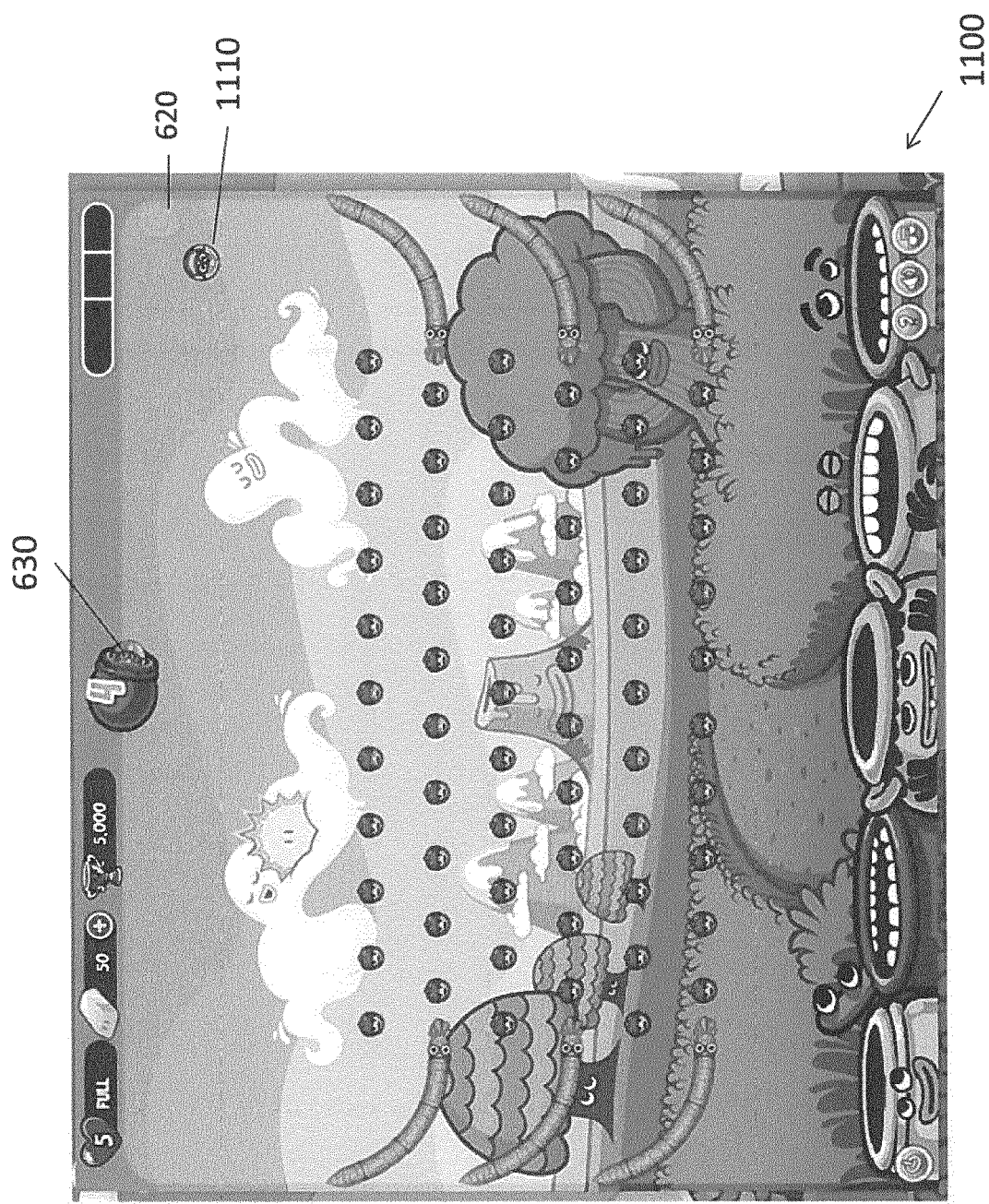
FIG. 11 depicts an example display after modification according to an embodiment.

In one embodiment the trigger event may comprise determining the position of a game object, which is capable of interaction with other game objects. FIG. 11 shows an example wherein the released projectile 1110 is used as a trigger event object, so that the trigger event comprises determining the position of the released projectile. As shown when the distance between the projectile 1110 and the first object 620 falls below a predefined level, the one or more display characteristics are modified.

In another embodiment, the trigger event may comprise user input associated with a trigger event location. The use of a game pointer which moves continuously across the screen, as described above, is a one option. On many mobile devices, e.g. phones or tablets, a user may alter the trajectory of the projectile by touch input on the screen. In this case, the use of user input as a trigger event may be suitable. The trigger event location may be the location on the display 155 at which the user input is made. The distance between this location and the location of the first object then determines whether or not the one or more display characteristics are to be modified. It should be appreciated that the user input need not be an input made to a touch screen but could be any input.

In another embodiment, the trigger event may comprise determining the trajectory or predicated trajectory 640 of a projectile game object 630. In this case, the trigger event location may be taken to be the point on the trajectory line 640 at which the line is closest to the first object 620. The at least one processor 115, 220 may be configured to determine the minimum distance between the various parts of the line 640 and the first object 620. In this case, if the distance between the line and the first object 620 at any point is less than a predefined value, the one or more display characteristics of the first object 620 will be modified. Alternatively, the trigger event location may not be taken to be the point along the trajectory line 640 that is closest to the first object 620 but may be taken to be some other location associated with the trajectory 640.

An embodiment of a method will now be described with reference to FIG. 4 and FIGS. 6, 7, 8 and 9.

Figure 4:
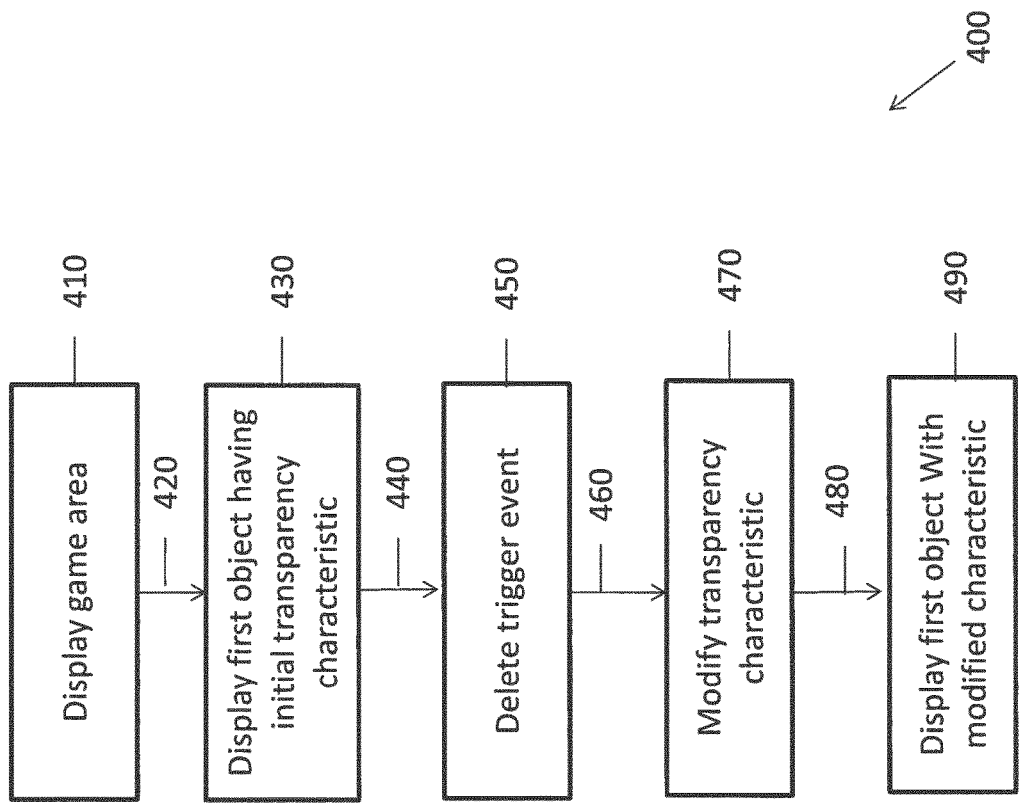
FIG. 4 shows an example flowchart of a method according to an embodiment.

FIG. 4 illustrates a flow diagram 400 in which at step 410 processor 115 retrieves from memory 120 or server 220 via network 210 an application which may include a computer implemented game with game area 600 and associated game objects 610a, 610b, 610c, 610d to display.

In an embodiment wherein the game is a "shooter" game, the processor may also retrieve for display player or user objects such as user launched and controlled projectiles 630 or trajectory aiming aids 640 for such projectiles.

In some embodiments wherein the application is a touch or mouse controlled game, user interface elements such as pointers may or may not be displayed as appropriate for the haptic interface hardware and resources available.

Regardless of application or game type, the processor 115 then proceeds via path 420 to step 430 wherein a first object 620 having an initial display characteristic defining a transparency state is displayed in a first area of the game area.

In an embodiment, the initial transparency state characteristic may be effectively zero. Hence, the first object 620 may not be transparent at all when displayed, and will overlay any game objects when displayed within its associated area 620a.

The processor 115 subsequently monitors via path 440 for a trigger event 450 and upon such detection proceeds via path 460 to step 470.

The trigger event may comprise in some embodiments touch input detected within the first area 620a.

In other embodiments the trigger event may comprise detecting a user object 630 or a selected user object trajectory 640 that causes said processor 115 to display said user object within the first area 620a in dependence on user input. Hence, the aiming or targeting of user objects 610a, 610b at, or to eventually coincide with the first area 620a containing the first object 6202 may equally comprise trigger events in some embodiments.

In some embodiments actual or potential interaction within the first area 620a of the game area 600 comprising game objects 610a, 610b, 610c, 610d overlaid by or obscured by the displayed first object 620 with its associated initial characteristic may be present.

For other game paradigms or types, other trigger events may be suitable, such as a "match-3" event that causes subsequent "match" or scoring events automatically in response to the initial input, the subsequent events occurring with the vicinity or within the first area 620a obscured by the first object 620.

That is, initial input may lead to subsequent automatic "cascade" (for matching paradigms) or "bounce" (in the context of pinball type paradigms such as Papa Pear Saga™) procedures which themselves may cause the processor to detect in advance events which may occur within the area 620a of the first object 620.

The processor 115, upon detecting such a trigger event 450 proceeds via path 460 to step 470 wherein the transparency characteristic, such as an alpha attribute is modified in a direction so as to increase the transparency of the first object (or decrease it's opacity) when displayed.

Flow then proceeds via path 480 to step 490 wherein the first object is then re-displayed with its associated modified transparency or alpha characteristic.

The modification may be done in a single pass, for example in one embodiment the alpha characteristic may simply be increased to 50% with 0% representing full opacity (i.e. no transparency) and 90% representing an almost fully transparent end state (with for example 100% indicating full transparency, i.e. the first object would be invisible when displayed).

In other embodiments, which will now be described with reference to FIG. 5, the modification may smoothly transition the visual appearance of the first object 620 from opaque, through to a transparency threshold defining an end state such as for example 90%, and subsequently back again to full opacity in real time.

Figure 5:
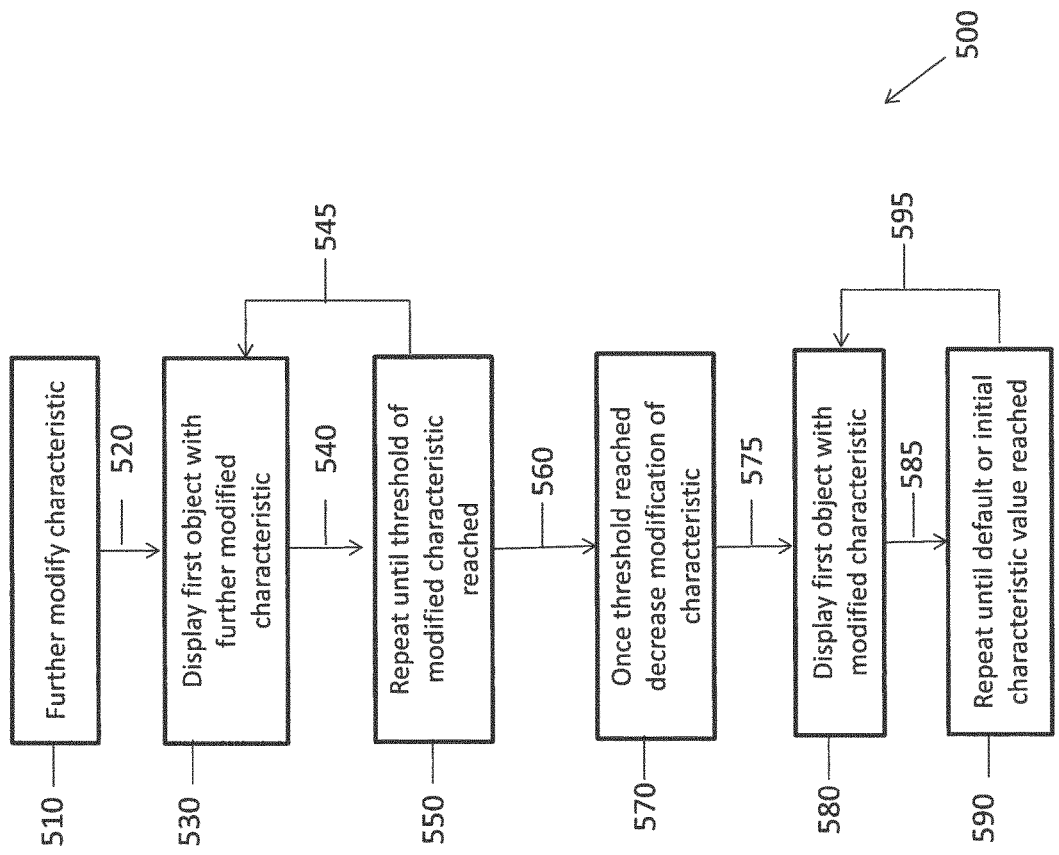
FIG. 5 illustrates a flowchart of a method according to another embodiment.

FIG. 5, illustrates an example embodiment of a method 500 in which an already modified, by for example the scheme of FIG. 4, first object 620 characteristic is then further modified at step 510, and subsequently via path 520 the first object 620 having the further modified characteristic is displayed at step 530. Flow may then proceed in some embodiments via path 540 to step 550 wherein step 530 and step 550 are repeated via path 545 until a threshold such as an end state parameter as previously described is reached.

In one example, the transparency characteristic may be modified in smooth increasing steps from for example 0% (no transparency) up to say 80 or 90% transparency (see FIG. 8). This may be achieved either step wise or gradually depending on the application and time available for the transition or on dependence on further user input removing the focus of events away from for example area 620a by adjusting trajectory 640 or by providing input in another area of the game area 600.

When the threshold is reached, the processor may then proceed via path 560 to step 570 wherein the characteristic is modified (for example decreased) at step 580 to return to its initial state or value at step 590.

In an embodiment the transparency characteristic may be modified in smooth steps from for example 90% (almost full transparency) to say 10 or 0% transparency (i.e. the first object 620 is opaque as shown in FIG. 6). This may be achieved either step wise or gradually by repeating steps 580 and 590 via path or loop 595 depending on the application and time available for the transition or on dependence on further user input removing the focus of events or actions away from for example area 620a (and hence not providing trigger events) by adjusting trajectory 640 or by providing input in another area of the game area 600.

Hence, a first object 620 may be displayed to a user on a game area 600 and its display characteristics modified automatically so that any parts of the game area 600 that were previously obscured by the first object, including any of the game objects 610a, 610b, 610c, 610d will be revealed so as to allow the user to continue to play the game with ease.

Figure 12:
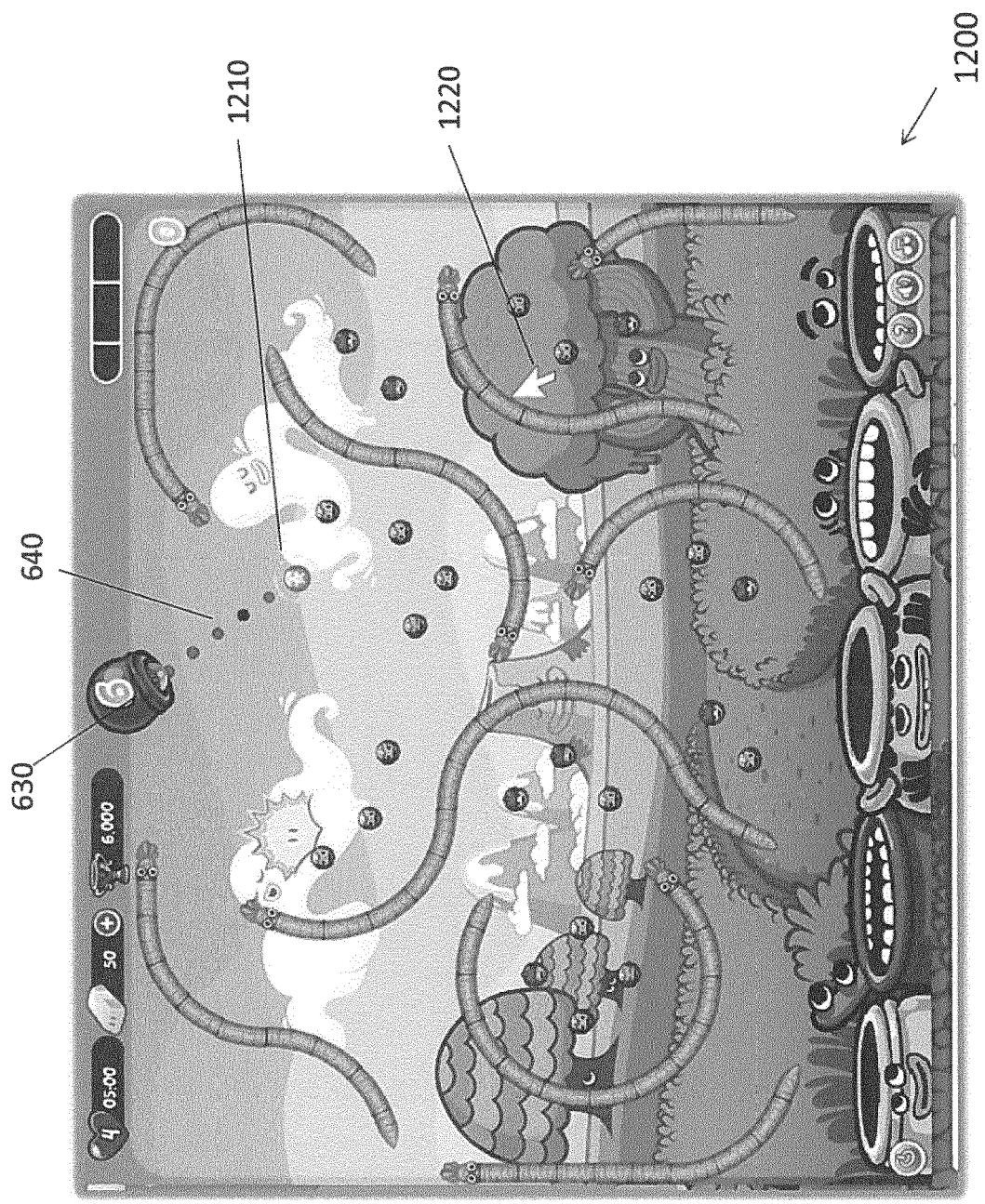
FIG. 12 depicts an example display before modification of game pointer transparency according to an embodiment.

As explained above, the first object can take several different forms, and may be a game object that can interact with other game objects in the game area. FIG. 12 shows an example of a game area 1200 having a first object which takes the form of a collectable item 1210. This collectable item 1210 is such that upon collision with the projectile, the collectable item 1210 is removed from the display 155 and the processor 115 causes a record of the collection to be recorded in memory 120 and the state of the gameplay to be altered, such that twice the numbers of points are awarded to the player during the level of the game.

In some cases, such as where the first object is a collectable item 1210, the user may encounter a problem wherein a game pointer or other object obscures the game area encompassing the first game object. Therefore, the user or player, in wishing to target the first object 1210 and other game object in the vicinity may feel frustration and disengagement since the game pointer 1220 may obscure objects in this area.

In some embodiments, altering the display characteristics of a trigger event object associated with the trigger event, for example a game pointer 1220, may be provided. The game pointer 1220 is provided with one or more display characteristics stored in memory 120 of the device 100 or in the network 250 as previously described with reference to FIG. 2.

In this example, the trigger event may take the form of determining the location of a game pointer 1220. However, it would be understood that the trigger event could be any suitable event. In the example shown in FIG. 12, the game pointer 1220 is displayed at a distance from the first object 1210 which, when determined by the processor, is determined to hold a value such that the display characteristics of the game pointer 1220 remain unmodified from their default stored value.

Figure 13:
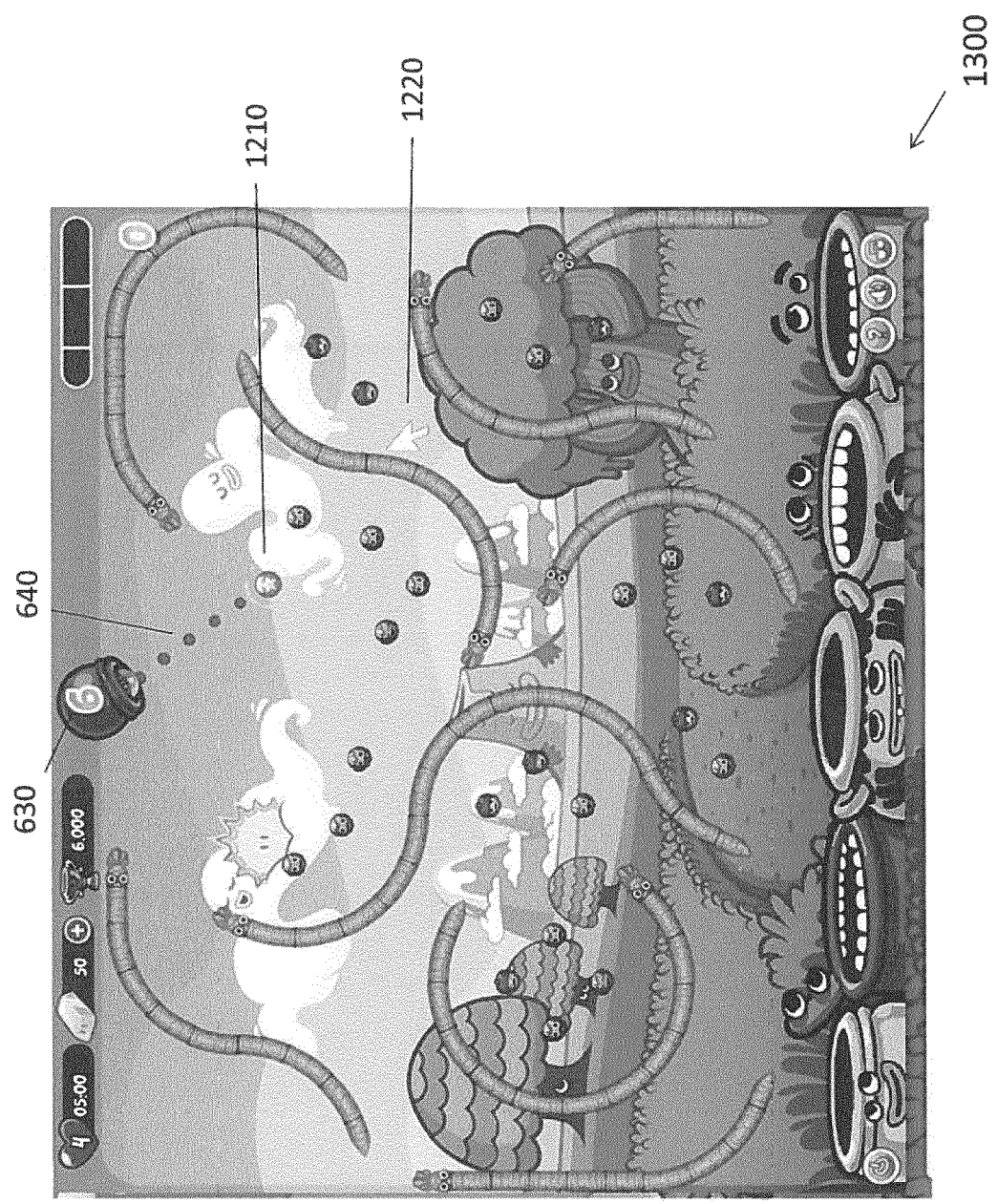
FIG. 13 depicts an example display having a modified game pointer transparency according to an embodiment.

FIG. 13 illustrates an example of the game area 1300 wherein the game pointer 1220 has been moved by user input to a new position on the display. The processor determines this new position and determines that the distance between the game pointer 1220 and the first object 1210 is such that the one or more display characteristics of the game pointer 1220 are to be modified. The one or more display characteristics, which in this embodiment comprise a transparency characteristic, are modified. This transition towards an end state can be clearly seen in FIG. 13, in which the game pointer 1220 possesses a modified transparency characteristic.

Figure 14:
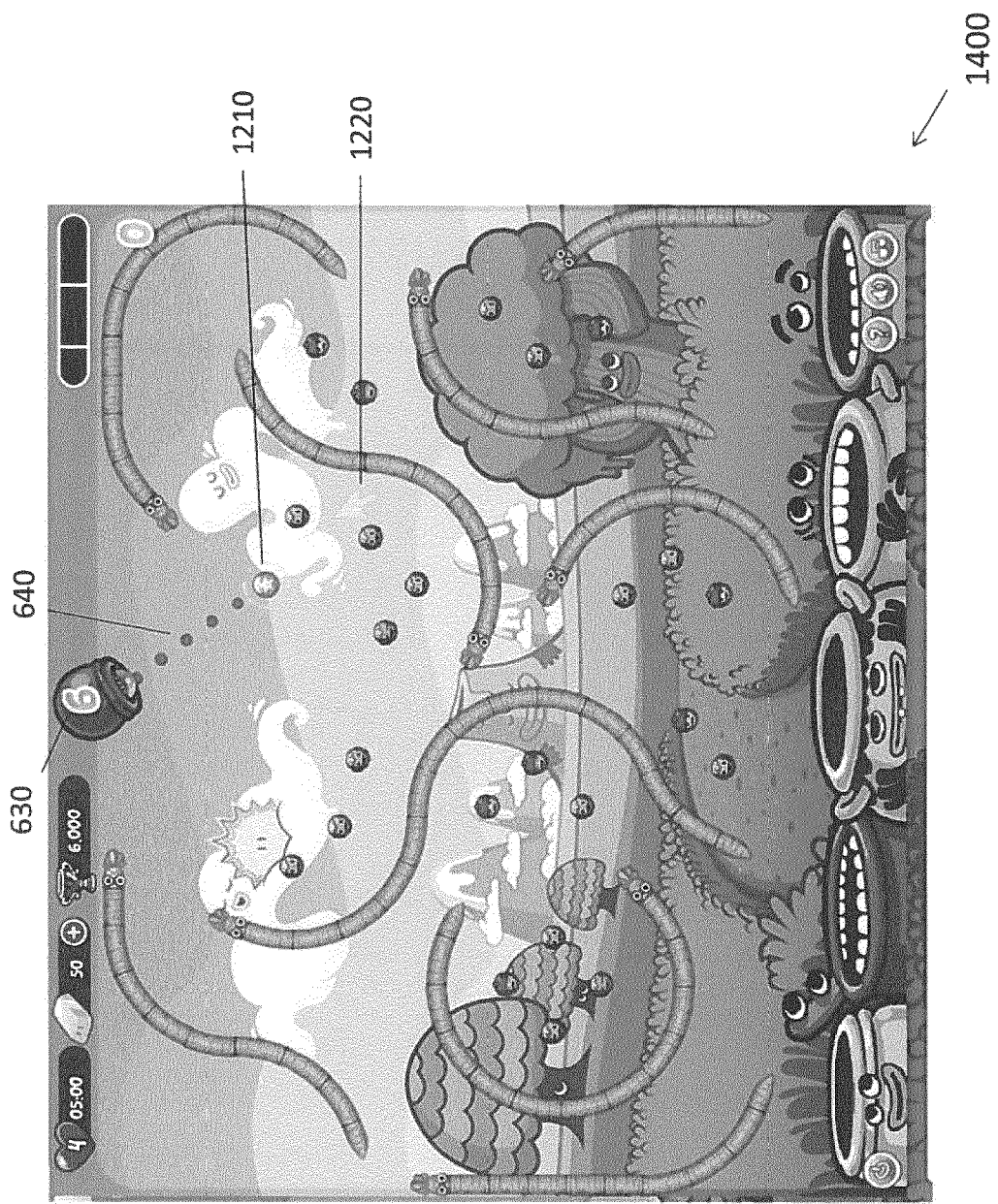
FIG. 14 depicts an example display having a modified game pointer transparency according to an embodiment.

FIG. 14 illustrates a game area wherein the distance between the game pointer 1220 and the first object 1210 have been reduced causing transparency modification to a predefined end state in which, as seen with reference to FIG. 14, the game pointer 1220 is barely visible. This end state may comprise an indicator of greater than 90% transparency for example.

Figure 15:
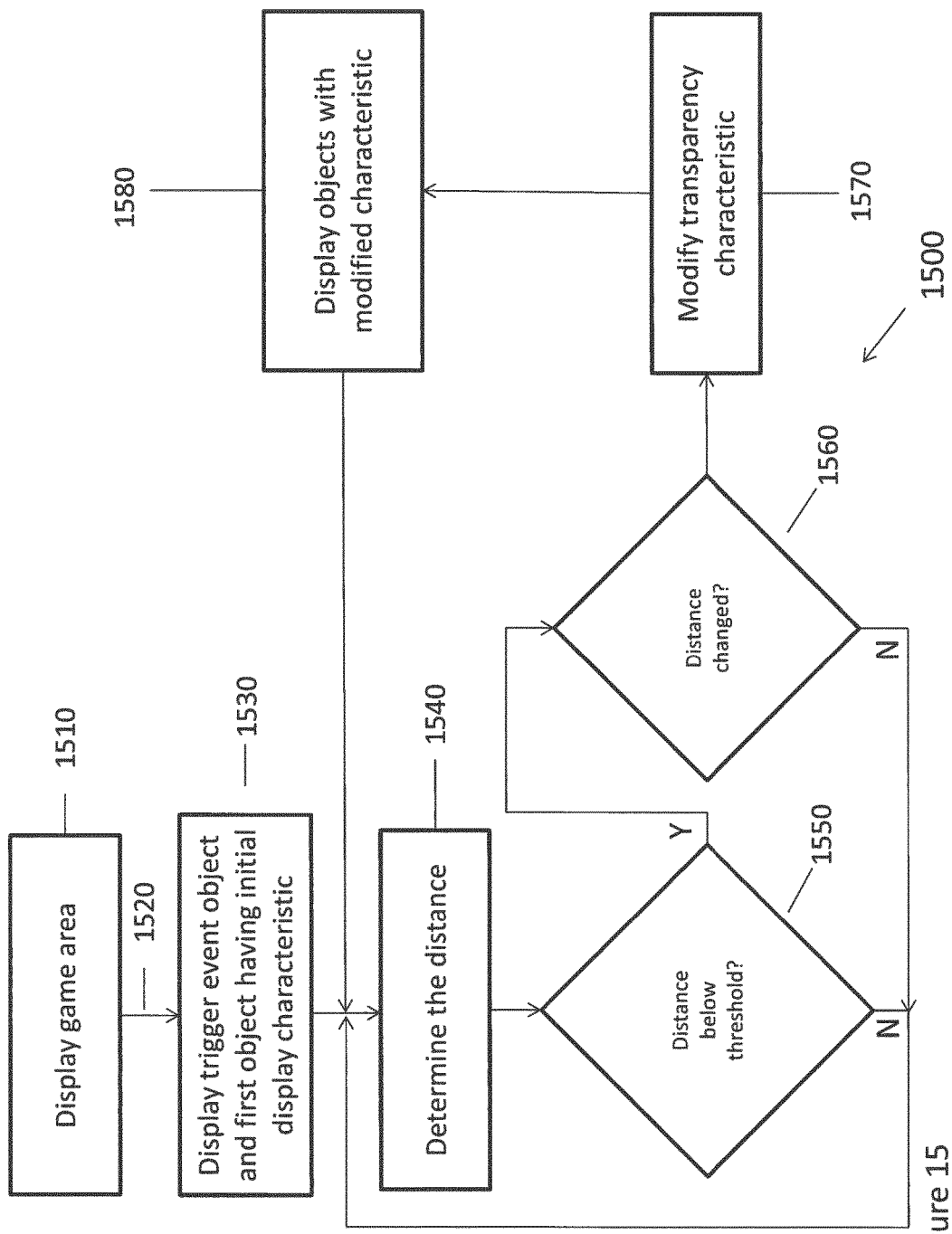
FIG. 15 shows an example flowchart of a method according to an embodiment.

FIG. 15 illustrates a flow diagram 1500 illustrating the steps which may be performed to alter the transparency factor of at least one of: a trigger event object, such as a game pointer, a first game object or at least one other game object. In one embodiment using this method, the transparency of either of these objects steadily vary with the distance between the first object and the trigger event location as illustrated by FIG. 8. However, it would be understood by the person skilled in the art that this method may be employed in other embodiments to alter the display characteristics, such as embodiments involving altering the display characteristics abruptly when the distance passes below a threshold or when the trigger event object passes into a predefined area surrounding the first object or altering the display characteristics steadily over time when the distance passes below a threshold or when the trigger event object 1220 passes into a predefined area surrounding the first object 1210.

At step 1510 processor 115 retrieves from memory 120 or server 220 via network 210 an application which may include a computer implemented game with game area 600, 1200 and associated game objects 610a, 610b, 610c, 610d to display.

The processor 115 then proceeds via path 1520 to step 1530 wherein a trigger event object, such as a game pointer 1220 or at least one game object, having an initial display characteristic defining a transparency state is displayed in a first area of the game area 1200 as well as a first object having an initial display characteristic defining a transparency state.

In an embodiment, the initial transparency state characteristic may be effectively zero. Hence, the trigger event object and the first object may not be transparent at all when displayed, and will overlay any other game objects when displayed.

At step 1540, the processor determines the position of the trigger event object 1220 and from this determines the distance between the first object and the trigger game object. The relevant position data may be stored in memory 120 and be updated when the processor 115 receives user input via the input device 165. The processor 115 uses the game engine 170, which is stored in the memory 120 of the device, to determine the changes to be made to the trajectory and position of the trigger event object on the basis of the user input. The processor 115 may receive user input and then calculate a new position for the trigger event object on the basis of this user input and game engine data loaded from the memory 120. When the new position has been determined it may then be stored in the memory 120. The data representing this position, which is stored in the memory 120, may then be periodically checked by the processor 115 to determine the location of the trigger event object and the location of the first object, and on the basis of a comparison of the locations of the two objects to determine the appropriate response in the subsequent steps.

Alternatively, the processor 115 may not periodically check the location of the trigger event object but may only determine the location when a change to the trigger event object occurs. In this case, a signal is transmitted from the input device 165 to the processor 115. The processor 115 may then retrieve the location of the first object 1210 from the memory 120, and on the basis of a comparison between the new location of the trigger event object 1220 and the location of the first object 1210, the processor 115 may then determine the appropriate response in the subsequent steps.

As mentioned above, the first object may take the form of an advertisement, a game message or a notification. Such a notification may not be present in the game area throughout the duration of the play of the level but may appear on the screen part way through the level and even then may only appear for a limited duration. In one embodiment, the first object may be determined by the processor 115 to be displayed on the display 155 in response to a message received over WAN 150. In other embodiments, part of the game program pre-stored at the memory 120 may cause the processor 115 to signal the graphics controller 125 to display the first object.

When a processor causes the first object to be displayed part the way through play of the level, the processor may initiate the process described above wherein the processor 115 periodically checks the location of the trigger event object and the first object and compares their locations so as to determine the distance between the two objects. Additionally or alternatively, when the first object is displayed, the processor 115 may immediately load the location of the first object and the location of the trigger game object from the memory 120 and determine the distance between the two.

At step 1550, after having determined the position of the trigger event object and the first object, and determining the distance between these two objects, the processor may retrieve from the memory 120, the predefined threshold value below which the one or more display characteristics of the trigger event object or the one or more display characteristics of the first object are to be modified. The threshold value may take on different values in dependence upon the type of first object in question.

Alternatively or additionally, the memory may store data defining a predefined area 620a of the game area, which encompasses the first object 620. In this case, the processor used the computed distance value and/or the trigger event location, which it compares to the defined game area to determine whether or not the one or more display characteristics of the trigger event object or the first object are to be modified. If the trigger event object has transitioned from a position within the area to a position outside of the area the one or more display characteristics of the first object or the one or more display characteristics of the trigger event object may be modified.

When the game is initially downloaded through the WAN 150 from the server 220, the downloaded data file comprising the game data may comprise a threshold value or data defining a predefined area 620a which is associated with the parameters defining the characteristics of the game objects functioning as first game objects for the purposes of the present invention. Alternatively or additionally, the predefined threshold value/s or predefined area/s may be downloaded from the server 220 at a later point in time.

If it is determined by the processor 115 that the distance between the trigger event object 1220 and the first object 1210 is greater than the predefined threshold value associated with the first object, the method returns to step 1540, wherein the processor 115 once again determines the position of the trigger event object.

If it is determined that the distance between the trigger event object 1220 and the first object 1210 is less than the predefined threshold value associated with the first object, the method moves to step 1560, at which point it is determined whether or not the distance value has value has changed since the previous check was made to determine the position of the trigger event object at step 1540. This step may implemented by the memory 120 storing a record of the previous value of the trigger event object position each time said position is adjusted. Therefore, when the processor 115 retrieves the current position of the trigger event object and determines the current distance, it may also retrieve the previous position of the trigger event object and determines the previous distance. If the new distance is the same as the previous distance value then there is no need to modify the one or more display characteristics and the method moves back to step 1540 and the processor 115 determines the position of the trigger event object again. On the other hand, if the distance has changed its value, the method moves on to step 1570.

At step 1570, having determined that the distance value has changed, the transparency value may be determined from the distance value. This may be achieved using a predefined formula stored in the memory 120 which computes the transparency value as a function of the distance. An example of such a function is graphically represented in FIG. 8. In this case, the processor having computed the distance between the first object and the trigger event object, retrieves the function from the memory 120, and applies the function to the computed distance value to obtain the transparency value.

Alternatively, the memory 120 may store a look up table with a predefined set of distance values each of which is stored alongside a corresponding transparency value. In this case, the processor uses the computed distance value as a key into the look up table to obtain the corresponding transparency value.

Alternatively, the memory 120 may store data defining a single value corresponding to a predefined area 620a of the game area encompassing the first object 620. In this case, the processor once the processor has used the computed position of the trigger event object to determine that the object resides within the predefined area 620a, then the processor may load the single value determining the transparency.

In one embodiment, the determined transparency value may apply to the trigger event object, such that the trigger event object's one or more display characteristics are modified in response to a change in the distance between said trigger event object and said first object. In other embodiments the determined transparency value may apply to the first object, such that the first object's one or more display characteristics are modified in response to a change in the distance between said trigger event object and said first object. In another embodiment, the display characteristics of both of the objects may be dependent upon the distance.

An indication of whether or not the first object's display characteristics or the trigger event object's characteristics or the characteristics of another games object are to be modified may be stored in association with the first object in the memory 120. The formula or the lookup table or value corresponding to a predefined area 620a used may also be specific to the type of first game object in question. As with the threshold value, when the game is initially downloaded through the WAN 150 from the server 220, the downloaded data file comprising the game data may comprise said formula, said look up table or said value corresponding to said predefined area 620a, and an indication of whether the modification to the display characteristics are to be applied to the first object or the trigger event object or both. This data may be stored as part of the parameters defining the characteristics of the game objects which may function as first game objects for the purposes of the present invention. Alternatively or additionally, the predefined formulae, look up tables, or value corresponding to the predefined area 620a may be downloaded from the server 220 at a later point in time.

When the new transparency value has been determined, the processor 115 updates the memory 120 so that it stores the new transparency characteristic in association with the trigger game object or the first object.

At step 1580, the changes made to the trigger game object display parameters stored in the memory 120, are determined by the graphics controller 125, which signals the video output 135 to produce the game pointer 1220 first object 1210, or at least one game object having modified parameters on the display 155. In the embodiment of FIGS. 12-14, the game pointer is displayed having an altered transparency. In the embodiment of FIGS. 6, 7, 9, and 10, however, the score is displayed having an altered transparency.

In should be appreciated that the game area may contain a plurality of objects which act as first game objects. In this case the processor 115 must monitor the distance between a trigger event location and each of the first game objects, since the one or more display characteristics of the first game object and/or the trigger game object may be modified in dependence upon any of these distances.

Figure 16:
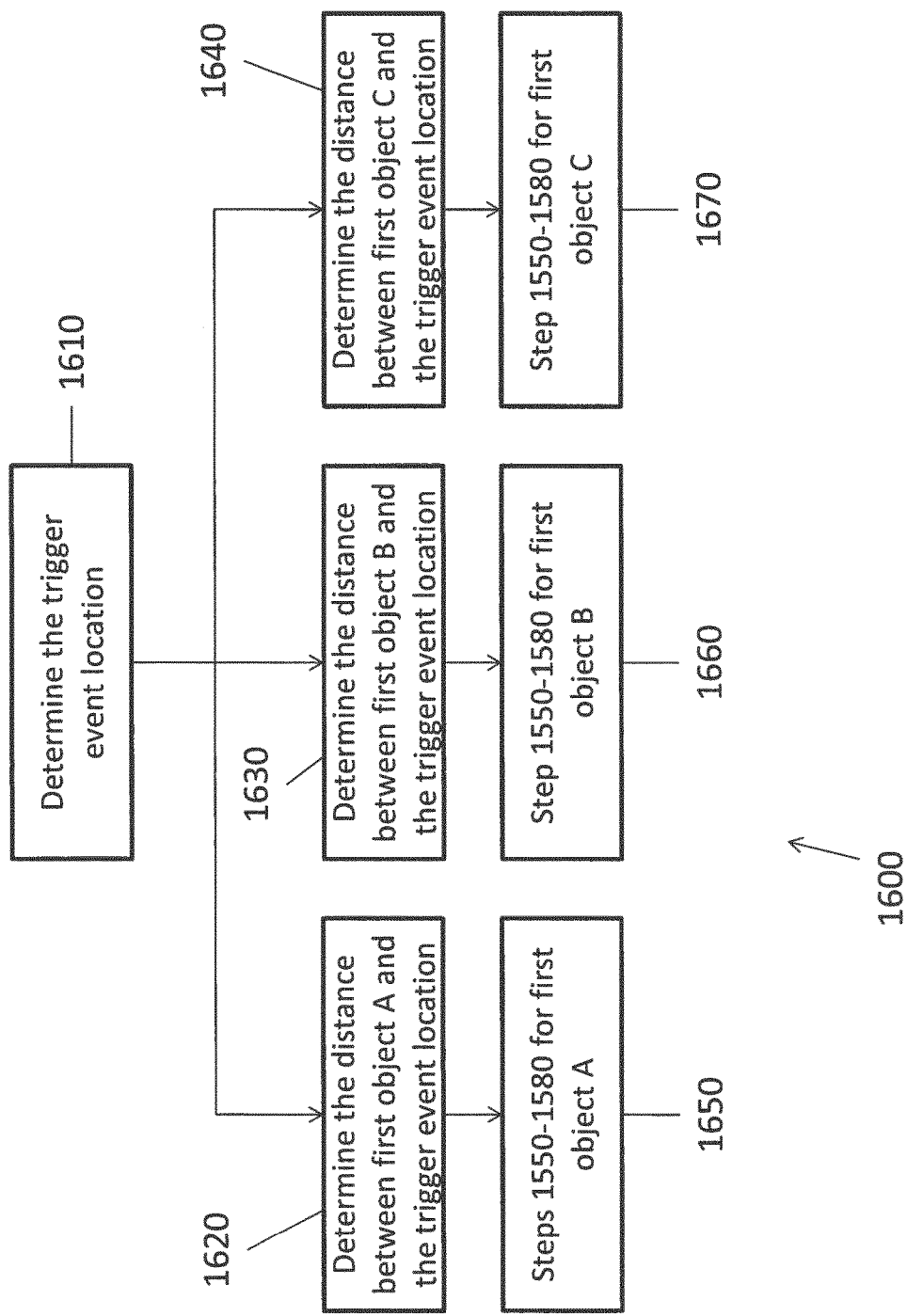
FIG. 16 shows an example flowchart of a method according to an embodiment.

FIG. 16 shows an example of a method 1600 of determining whether or not to modify the display characteristics of first game object/s or any trigger event objects in the embodiment in which there are a plurality of first game objects displayed in the game area. The first game objects are referred to as first object A, first object B, first object C.

At step 1610, the processor detects a trigger event and determines a location associated with said trigger event. Detecting this event and determining its location may be carried out in much the same way as step 430 of method 400 or step 1530 and may comprise detected use input via input device 165 or detecting a change in object position or trajectory stored in memory 120 amongst other embodiments.

Having determined the trigger event location, the method proceeds to steps 1620, 1630, and 1640, wherein the processor loads the positions of the first game objects A, B, and C and compares them to the position of the trigger even location so as to determine the distance between the trigger event location and each of the first game object A, B, C.

Having determined the distances, the method proceeds to steps 1650, 1660, and 1670, wherein the device carries out the steps 1550-1580 as detailed in the description of the method 1500 for each of objects A, B, and C. When carrying out these steps, the processor loads the distances determined in steps 1620, 1630, 1640, and on the basis of these distance calculations determines whether or not to modify the said one or more display characteristics of the first objects A, B, C and/or said one or more display characteristics of a trigger event object.

Hence, a first object 620 may be displayed to a user on a game area 600 and its display characteristics modified automatically so that any parts of the game area 600 that were previously obscured by the first object, including any of the game objects 610a, 610b, 610c, 610d will be revealed so as to allow the user to continue to play the game with case.

Furthermore, if the game area comprises a trigger event object, such as a game pointer, associated with the trigger event, its display characteristics may be modified automatically so that any parts of the game area that would be obscured by the trigger event object, including the first object will remain revealed so as to allow the use to continue to play the game with case.

Those skilled in the art will appreciate that the transparency characteristic may comprise techniques such as alpha blending depending on the graphics chipset 125 and associated methodology utilised in the user device 100. Hence, a first object 620 providing useful feedback to a user may be triggered to be modified so as to automatically fade out and fade back when appropriate depending on real time input.

The first object 620 may comprise syndicated or other content such as advertisements or offers of partners associated with the application provider and dependent on user preferences in viewing such content.

A person skilled in the art will realise that the different approaches to implementing the methods and device considerations herein are not exhaustive, and that which is described comprises certain embodiments. It is possible to implement the above in a number of variations without departing from the spirit or scope of the invention.

The invention claimed is:

1. A method comprising the following implemented by at least one processor of a device, said at least one processor being in communication with a user interface and at least one memory:
    displaying on a display of said device a display area for a game having a plurality of game objects displayed at game object positions;
    displaying a first object having a transparency factor at a first location, said first object overlying at least one of said plurality of game objects;
    detecting a trigger event;
    modifying at least one of said transparency factor of said first object, a transparency factor of a game pointer, and a transparency factor of at least one game object; and
    displaying at least one of said first object, said game pointer, and said at least one game object with said at least one modified transparency factor;
    wherein the transparency factor of the first object is set to a transparency level such that at least one of the game objects is visible through the first object; and
    wherein the first object comprises a message offering one or more game objects or elements to a player of the game for use in the game.

2. A method according to claim 1, wherein the step of modifying at least one of said transparency factor of said first object, a transparency factor of a game pointer, and a transparency factor of at least one game object, occurs in dependence upon the distance between said first location and a trigger event location associated with the trigger event.

3. A method according to claim 2, further comprising the step of:
    increasing at least one of said transparency factor of said first object, said transparency factor of a game pointer, and said transparency factor of at least one game object if the distance between the trigger event location and said first location decreases.

4. A method according to claim 2, further comprising the step of:
    decreasing at least one of said transparency factor of said first object, said transparency factor of a game pointer, and said transparency factor of at least one game object if the distance between the trigger event location and said first location increases.

5. A method according to claim 2, wherein said first location is within a first area of the game area, the method further comprising the steps of:
    increasing at least one of said transparency factor of said first object, a transparency factor of a game pointer, and a transparency factor of at least one game object if said trigger event location enters said first area of the game area.

6. A method according to claim 2, wherein said first location is within a first area of the game area, the method further comprising the steps of:
    decreasing at least one of said transparency factor of said first object, a transparency factor of a game pointer, and a transparency factor of at least one game object if said trigger event location exits said first area of the game area.

7. A method according to claim 1, wherein said trigger event comprises determining the position of said game pointer.

8. A method according to claim 1, wherein said trigger event comprises determining the position of a game object displayed on the display area.

9. A method according to claim 1, wherein said trigger event comprises determining the position of said at least one game object displayed on the display area.

10. A method according to claim 1, wherein said trigger event comprises user input.

11. A method according to claim 1, wherein said trigger event comprises determining the trajectory or predicted trajectory of a game object.

12. A method according to claim 1, wherein a modification of at least one of said transparency factor of said first object, said transparency factor of a game pointer, and said transparency factor of at least one game object provides a gradual displayed transparency transition of at least one of the first object, the game pointer and the at least one game object from an initial level to a set transparency level.

13. A method according to claim 12, wherein the modification is reversed after a threshold associated with the trigger event is reached.

14. A method comprising the following implemented by at least one processor of a device, said at least one processor being in communication with a user interface and at least one memory;
displaying on a display of said device a display area for a game having a plurality of game objects displayed at game object positions;
displaying a first object having a transparency factor at a first location, said first object overlying at least one of said plurality of game objects;
wherein the transparency factor of the first object is set to a transparency level such that at least one of the game objects is visible through the first object;
wherein the first object comprises a message offering one or more game objects or elements to a player of the game for use in the game; and
wherein said offered one or more game objects or elements comprises a booster.

15. A method comprising the following implemented by at least one processor of a device, said at least one processor being in communication with a user interface and at least one memory;
displaying on a display of said device a display area for a game having a plurality of game objects displayed at game object positions;
displaying a first object having a transparency factor at a first location, said first object overlying at least one of said plurality of game objects; and
determining whether to modify said transparency factor in dependence upon data stored in said at least one memory in association with said first object;
wherein the transparency factor of the first object is set to a transparency level such that at least one of the game objects is visible through the first object;
wherein the first object comprises a message offering one or more game objects or elements to a player of the game for use in the game.

16. A device having a display, a user interface, at least one memory, and at least one processor in communication with said user interface and said at least one memory, the at least one processor configured to:
display a display area for a game on said display comprising a plurality of game objects displayed at game object positions;
display said first object having a transparency factor at a first location, said first object overlying at least one of said plurality of game objects;
detect a trigger event;
modify at least one of: said transparency factor of said first object, a transparency factor of a game pointer, and a transparency factor of at least one game object; and
display at least one of: said first object, said game pointer, and said at least one game object with said at least one modified transparency factor;
wherein the transparency factor of the first object is set to a transparency level such that at least one of the game objects is visible through the first object; and
wherein the first object comprises a message offering one or more game objects or elements to a player of the game for use in the game.

17. A device according to claim 16, wherein the transparency factor comprises alpha blending.

18. A device having a display, a user interface, at least one memory, and at least one processor in communication with said user interface and said at least one memory, the at least one processor configured to:
display a display area for a game on said display comprising a plurality of game objects displayed at game object positions;
display said first object having a transparency factor at a first location, said first object overlying at least one of said plurality of game objects;
wherein the transparency factor of the first object is set to a transparency level such that at least one of the game objects is visible through the first object;
wherein the first object comprises a message offering one or more game objects or elements to a player of the game for use in the game; and
wherein said transparency factor comprises an initial state and an end state.

* * * * *